(12) United States Patent
Dalrymple

(10) Patent No.: US 10,143,181 B2
(45) Date of Patent: Dec. 4, 2018

(54) ERECTABLE TROUGH

(71) Applicant: Roger Kenneth Roy Dalrymple, Bulls (NZ)

(72) Inventor: Roger Kenneth Roy Dalrymple, Bulls (NZ)

( * ) Notice: Subject to any disclaimer, the term of this patent is extended or adjusted under 35 U.S.C. 154(b) by 0 days.

(21) Appl. No.: 15/131,809

(22) Filed: Apr. 18, 2016

(65) Prior Publication Data
US 2016/0227734 A1 Aug. 11, 2016

Related U.S. Application Data

(63) Continuation of application No. 13/388,909, filed as application No. PCT/NZ2010/000158 on Aug. 5, 2010.

(30) Foreign Application Priority Data

Aug. 5, 2009 (NZ) ........................................ 578867

(51) Int. Cl.
*A01K 5/01* (2006.01)

(52) U.S. Cl.
CPC ...................................... *A01K 5/01* (2013.01)

(58) Field of Classification Search
CPC .............................. A01K 5/01; A01K 5/0107
USPC ...................................... 119/52.1, 58, 51.01
See application file for complete search history.

(56) References Cited

U.S. PATENT DOCUMENTS

| | | | |
|---|---|---|---|
| 35,259 A | 5/1862 | Ralston | |
| 159,601 A | 2/1875 | Mitchell | |
| 177,178 A | 5/1876 | Walton et al. | |
| 261,842 A | 8/1882 | French | |
| 391,580 A | 10/1888 | Burton | |
| 422,007 A | 2/1890 | Burton | |
| 471,868 A | 3/1892 | Leech | |
| 489,808 A | 1/1893 | Higgins | |
| 514,203 A | 2/1894 | Schmidt | |
| 525,459 A | 9/1894 | Hill | |
| 577,631 A | 2/1897 | Stacy | |
| 654,427 A | 7/1900 | Atsatt | |

(Continued)

FOREIGN PATENT DOCUMENTS

GB 2011016735 A1 2/2011

*Primary Examiner* — Marc Burgess
*Assistant Examiner* — Morgan T Barlow
(74) *Attorney, Agent, or Firm* — Workman Nydegger

(57) ABSTRACT

A trough includes an elongate trough body and at least one elongate support element. The trough body includes at least one longitudinal side wall portion and a bottom portion which are integral with one another, or attached to one another along respective longitudinal edges. The support element extends along the outer face of the side wall portion. The support element may be restrained from moving outward, away from a longitudinal trough centerline, by connecting a restraint located inside the trough to the support element. The side wall portion is maintained upright partly by tension in the support element or in the restraint. In one embodiment, a plastics sheet material is bent into a U-shaped animal feed trough with opposite side walls supported upright by tension in longitudinal supporting wires and transverse restraint wires, the ends of which connect to the support wires through respective perforations in the side walls.

17 Claims, 5 Drawing Sheets

(56) References Cited

U.S. PATENT DOCUMENTS

| | | | |
|---|---|---|---|
| 678,104 A * | 7/1901 | Glidden | B65D 15/18 |
| | | | 119/61.1 |
| 700,522 A | 5/1902 | Maginnis | |
| 715,478 A | 12/1902 | Helmick | |
| 737,789 A | 9/1903 | Sprow | |
| 755,753 A | 3/1904 | Davis | |
| 786,674 A | 4/1905 | Polski | |
| 795,484 A | 7/1905 | Coble | |
| 809,958 A | 1/1906 | Kennedy | |
| 822,763 A * | 6/1906 | Paulus | A01K 5/01 |
| | | | 119/61.1 |
| 906,396 A | 12/1908 | Drake et al. | |
| 1,076,724 A | 10/1913 | Vertrees | |
| 1,126,907 A | 2/1915 | Stocking | |
| 1,198,238 A | 9/1916 | Klein et al. | |
| 1,213,053 A | 1/1917 | Wooldridge | |
| 1,252,521 A | 1/1918 | Weaver | |
| 1,349,841 A * | 8/1920 | Luedke | A01K 5/01 |
| | | | 119/61.1 |
| 1,405,568 A | 2/1922 | Conklin | |
| 1,407,404 A | 2/1922 | Allen | |
| 1,418,516 A | 6/1922 | Bayne | |
| 1,423,552 A | 7/1922 | Bayne | |
| 1,424,371 A | 8/1922 | Naylor | |
| 1,432,051 A | 10/1922 | Burrell | |
| 1,727,610 A | 9/1929 | Kramer | |
| 2,280,537 A | 4/1942 | Emanuel | |
| 2,448,707 A | 9/1948 | Erickson | |
| 2,501,981 A | 3/1950 | Hix | |
| 2,583,874 A | 1/1952 | Niemann | |
| 2,625,289 A | 1/1953 | Emanuel | |
| 3,092,007 A | 6/1963 | Smoker et al. | |
| 3,121,418 A | 2/1964 | Stone | |
| 3,198,174 A | 8/1965 | Gilmore | |
| 3,972,307 A | 8/1976 | Marseillan | |
| 4,779,570 A | 10/1988 | Pereda | |
| 4,793,289 A | 12/1988 | Peeso | |
| 4,825,588 A | 5/1989 | Norman | |
| 4,915,060 A | 4/1990 | Kling et al. | |
| 5,195,455 A | 3/1993 | van der Lely | |
| 5,554,248 A | 9/1996 | Payne | |
| 2008/0115731 A1 | 5/2008 | Walker | |
| 2009/0199774 A1 | 8/2009 | Hamilton | |
| 2009/0241847 A1 * | 10/2009 | Staggs, Jr. | A01K 5/01 |
| | | | 119/61.1 |
| 2011/0120380 A1 | 5/2011 | Sladkowski | |
| 2011/0253053 A1 | 10/2011 | Kurtz | |
| 2014/0299063 A1 | 10/2014 | Dalrymple | |

\* cited by examiner

ERECTABLE TROUGH

CROSS-REFERENCE TO RELATED APPLICATIONS

This application is a continuation of U.S. application Ser. No. 13/388,909, filed Mar. 7, 2012, which is a nationalization of PCT Application No. PCT/NZ2010/000158, filed Aug. 5, 2010, which claims priority to New Zealand Application No. 578867, filed Aug. 5, 2009, which applications are hereby incorporated herein by specific reference.

FIELD OF INVENTION

The present invention relates to a trough and in particular to a trough from which farm animals can feed. The trough is open-topped and is suited for containment of feed materials for feeding out simultaneously to a large number of animals, for example sheep or cattle. The trough can be advantageously used in conjunction with one or more overhead electrified wires to reduce contamination and wastage of the feed material by deterring animals from walking or encroaching into or onto the trough.

BACKGROUND

Many animal feeding systems are known. Dry feed material can be distributed directly onto the ground or floor but significant wastage can occur from trampling and soiling by the animals. It is known to contain the dry feed in troughs or other containment devices to reduce spoilage from the animals. These devices often provide only a short perimeter length at which only a limited number of animals can access the feed. Where large numbers of animals are grouped together, shy feeders can be disadvantaged by not getting access to the feed material until the more dominant animals are sated, leaving less desirable or even insufficient feed remaining.

SUMMARY OF INVENTION

An object of at least one embodiment of the invention is to provide a trough for containing feed material, or at least to provide the public with a useful choice.

The invention may be broadly said to be a trough comprising an elongate trough body, at least one elongate support element and at least one transverse restraint, wherein:

the trough body comprises a bottom portion of the trough body and at least one side wall portion of the trough body;

the trough body is formed from at least one resilient semi-rigid sheet;

the side wall portion extends along a longitudinal side of the trough;

a lower longitudinal edge of the side wall portion is attached to, or continuous with, a longitudinal edge of the bottom portion;

the elongate support element extends along the outer face of the side wall portion and is lower than an upper edge of the side wall portion but higher than the bottom portion;

the restraint extends transversely across the inside of the trough, intermediate the ends of the trough, and is lower than the upper edge of the side wall portion but higher than the bottom portion;

the elongate support element is connected to the restraint and is restrained from moving outward, away from a longitudinal centreline of the trough, at least in part by a tension in the restraint; and the side wall portion is maintained upright in part by tension in the elongate support element, in part by the tension in the restraint, and in part by the resilient semi-rigidity of the sheet.

The restraint may be a wire. Preferably, the at least one side wall portion has at least one perforation, and an outer end of the restraint extends outwardly through the perforation to connect to the support element. An end of the restraint may be formed with a loop through which the at least one elongate support element passes to connect the support element to the restraint.

The at least one support elongate element may be tensioned between two anchor devices which are located at respective ends of the support element. The at least one support element may be supported at a predetermined height at one or more locations intermediate its ends. The at least one support element may be a wire.

Preferably, the trough body has two opposed side wall portions which extend along respective opposite longitudinal sides of the trough the trough has two elongate support elements which extend along respective outer faces of the two side wall portions;

each side wall portion has perforations which are distributed along the length of the trough;

the perforations in one side wall portion are respectively aligned transversely across the trough with corresponding perforations in the opposite side wall portion; and a plurality of restraints is located substantially inside the trough with opposite ends of each restraint extending outwardly through respective pairs of transversely aligned perforations to connect respectively to the elongate support elements.

The side wall portion may be integral with the bottom portion.

Preferably, the sheet is continuous along the length of the trough. Alternatively, the trough may comprises discrete length portions that are distributed along the length of the trough, and are formed from respective sheets. The discrete length portions may be distributed along the length of the trough with adjacent discrete portions partially overlapping one another.

The sheet or each respective sheet may be made of a plastics material. The sheet or each respective sheet may be provided with a line of weakness about which the sheet or each respective sheet preferentially bends when the side wall portion is made non-planar with the bottom portion. The sheet or each respective sheet may be creased to provide the line of weakness. The sheet or each respective sheet may be provided with perforations along the line of weakness.

Preferably, the bottom portion is perforated to provide one or more drainage holes.

The term 'comprising' as used in this specification or in the accompanying claims means 'consisting at least in part of', that is to say when interpreting statements in this specification or in the accompanying claims which include that term, the features, prefaced by that term in each statement, all need to be present but other features can also be present.

BRIEF DESCRIPTION OF THE DRAWINGS

Preferred embodiments and methods of utilising the invention will be further described, with reference to the accompanying figures, by way of example only and without intending to be limiting, wherein.

DETAILED DESCRIPTION OF PREFERRED EMBODIMENTS

Referring to the figures it will be appreciated that the invention may be implemented in various forms and modes. The following description of preferred embodiments of the invention is given by way of example only.

Figure 1:
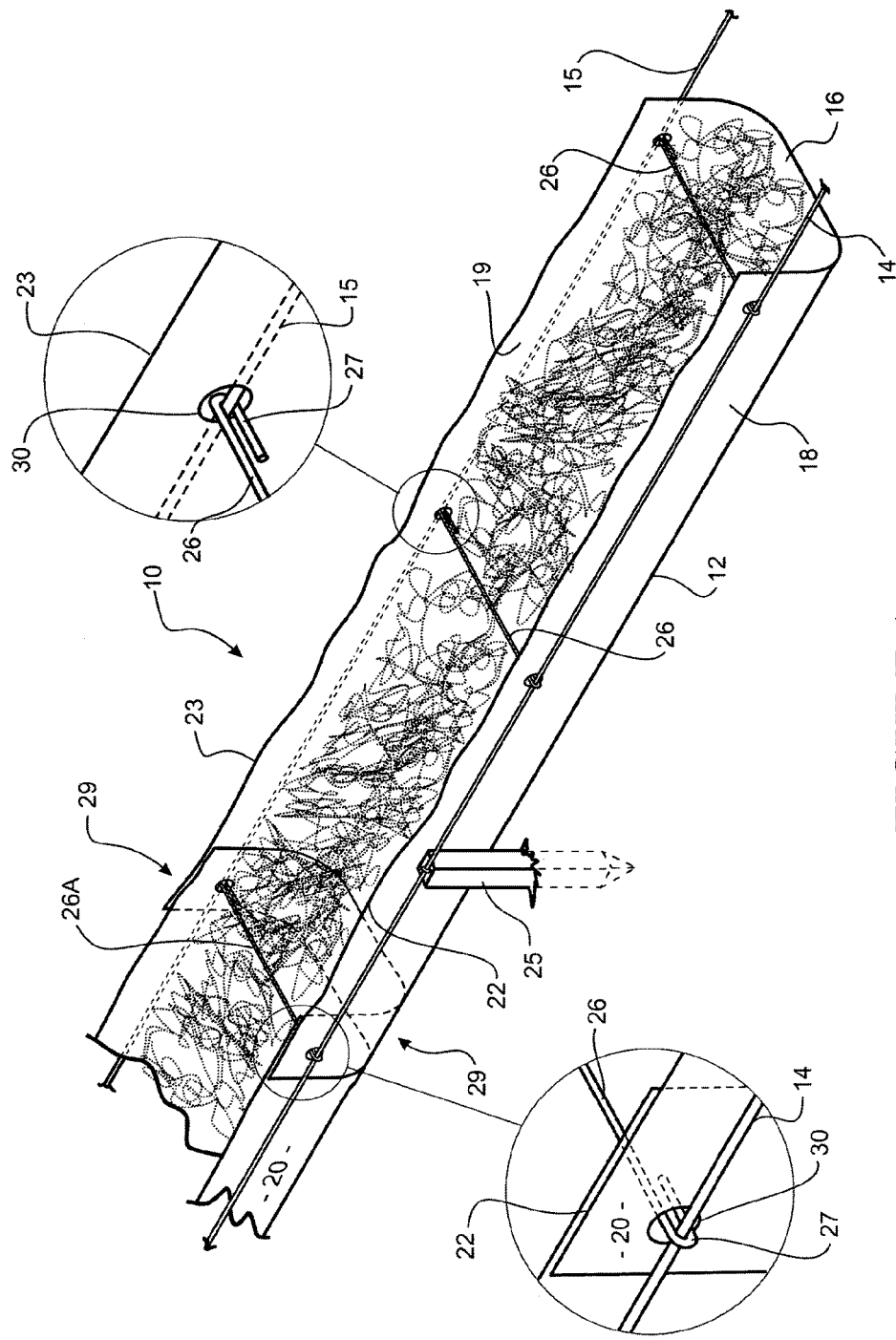
FIG. 1 shows a perspective view of part of a first trough according to the current invention.

FIG. 1 shows a perspective view of part of a first embodiment of a trough 10. The trough is placed on the ground, for example out in a paddock, or alternatively on a floor surface, for example in a barn.

The trough is elongate and comprises an elongate trough body 12 and two elongate support elements in the form of longitudinal supports 14, 15.

The trough body is made from a sheet material that provides a floor or bottom portion 16 of the trough body, and two opposed side wall portions which extend upwardly from opposite elongate side edges of the floor portion to form the trough side walls 18, 19. The sheet material is laid out on a floor or ground surface and folded, bent or curved along two spaced and generally parallel lines to form both trough side walls integrally with the trough floor.

The longitudinal supports 14, 15 extend along respective outer faces 20 of the opposite side walls below the upper edges 22, 23 of the side walls 18, 19 but higher than the floor or bottom portion 16 of the trough. The side walls are maintained upright at least in part by the respective supports 14, 15.

The longitudinal supports 14, 15 may each be made from a rigid or semi-rigid material, for example a tube or pipe or a high tensile steel wire or rod.

Alternatively, the side walls may be maintained upright at least in part by tension in the respective supports 14, 15. The supports 14, 15 may be wires that are tensioned between two anchor devices (not shown in the figures) located at respective opposite ends of the wires.

The longitudinal supports 14, 15 can be supported at a predetermined height by one or more blocks or posts at intermediate locations between the ends of the support wires. This is particularly useful to hold support wires at a desired height above an uneven ground surface, for example where the trough extends over a relatively high point and the tension in the support wires could tend to pull the support wires down and collapse the side walls, or conversely where the trough extends over a relatively low point and the tension in the support wires could tend to lift the support wires and the side walls, and at least partially close the trough. Where the trough is placed on the ground, the blocks or posts may be a peg 25 driven into the ground as shown in FIG. 1. The support may be secured to the top or a side face of the peg, for example by a U-shaped staple or other suitable fastener.

Perforations 30 are provided in the trough side walls 18, 19. As shown in FIG. 1, the perforations are approximately at a mid-height position in the side walls. The perforations may be provided at other heights. The perforations are provided as pairs of transversely-aligned perforations with the two perforations of each pair respectively provided in the two opposed side walls. The pairs of perforations are distributed at intervals, e.g., at 2 meter intervals, along the length of the trough body.

Restraints 26 extend transversely across the width of the trough. As best seen in the two magnified part views of FIG. 1, loops 27 at the ends of the restraints protrude partially through respective perforations 30 in the side walls. The supports 14, 15 lying along the outer faces of the side walls pass through the loops to restrain the supports, and thus the side walls, from outward movement, i.e., movement away from the longitudinal centreline of the trough.

The side walls 18, 19 are restrained and held upright, at least in part, by the restraints 26 and by the two supports 14, 15. Where a restraint 26 or a support 14, 15 is a wire, the side walls 18, 19 may be restrained and held upright, at least in part, by tension in the restraint wire or the support wire.

Each restraint 26, including the end loops 27, may be fashioned from a length of wire, as seen in FIG. 1. The restraints may be flexible so that if pressure is applied to the outer face of a side wall 18, 19, for example by an animal feeding at the trough, the side wall can bend inward at least in the in the locality of the applied pressure.

In another embodiment (not shown in the figures), two or more elongate support wires can be used along one or each side wall of the trough. For example, a high trough side wall can be supported by a pair of support wires, one above the other, with the support wires connected to the ends of respective upper and lower sets of transverse restraint wires through respective upper and lower sets of perforations in the side walls.

Inward movement of the side walls 18, 19 may be restrained by one or more compression elements (not shown in the figures), with each compression element extending transversely across a major part of the width of the trough, between the two side walls. For example, each restraint wire 26 may be threaded through a respective tube that is located between the side walls to help reduce inward movement of the side walls and maintain the distance between the two side walls. The tube may be a length of alkathene pipe.

The tubes may have a diameter that is greater than that of the perforations 30 in the side walls so that the end of the tube cannot pass through the perforation and instead engages against the inner face of a respective side wall. Alternatively, where a tube has a diameter less than that of the perforations, a washer or similar device, having an outer dimension that is greater than the diameter of the perforations 30 in the side walls, and perforated with a hole with a diameter that is smaller than the tube diameter, is placed between a respective end of the tube and the inner face of the side wall.

The sheet material is preferably a resilient, semi-rigid plastics material such as a heavy duty polyethylene, polythene or polypropylene. The trough side walls may be biased to push outwards against the support wires by the inherent resilience, or 'memory', of the sheet material. The rigidity of the sheet material is sufficient so that the upper edge portion of the upright side walls, which is cantilevered above the support wires 14, 15, is maintained substantially upright. In currently preferred embodiments, the trough body is a polyethylene plastics sheet material with a thickness of either 2 mm or 3 mm. However, the invention is not limited to troughs having bodies made from the above-mentioned sheet plastics materials and sheet thicknesses.

Alternatively, or additionally, inward movement of the side walls 18, 19 may be restrained by making the transverse restraints sufficiently rigid and securing the outer ends of the restraints to the side walls. In an arrangement not shown in the figures, enlargements, for example loops 27, at the outer ends of the transverse restraints 26, 76 may be secured, for example by tying with a cable tie passing through a corresponding perforation 30 in one of the trough side walls 18, 19, to an object, for example a washer or short length of pipe or tube that is located at the outside of the trough wall. Each enlargement at an end of a restraint, and the washer, pipe or tube to which it is tied, has a dimension larger than the diameter of the corresponding perforation 30 in the side wall 18, 19 so that the enlargement and the washer, pipe or tube cannot pass through the perforation. In this way the side wall is secured to the end of the restraint. The side walls may be held outward, at least in part, by rigidity in the restraints.

A wave, or upright ribs or corrugations, may be formed in the side walls to enhance the rigidity of the side walls. The wave or ribs or corrugations may be pre-formed in the longitudinal edge portions of the sheet material by thermoforming, or by stretching the material beyond its elastic limit. The wave or corrugations stiffen the side walls and help support the side walls, and particularly the cantilevered upper edge portion of the side walls above the support wires 14, 15, in an upright position.

The sheet material may be provided with lines of weakness (not shown in the figures) about which the sheet material preferentially bends when the side walls are erected. The lines of weakness may be formed by creasing the sheet, or by forming indentations or perforations in the sheet, along the intended lines of weakness.

The trough may be perforated with drainage holes (not shown in the figures) to allow rain water or other liquids to readily drain from the trough.

The sheet material may be continuous along the length of the trough body. Alternatively, the trough body may be divided into discrete body portions that are distributed along the length of the trough body. Preferably the discrete body portions are distributed along the length of the trough body with adjacent body portions partially overlapping one another, as can be seen in the overlap 29 shown in FIG. 1.

Respective pairs of side wall perforations in each of two overlapping body portions may be aligned and the loops at the ends of one restraint wire 26A passed through the perforations to restrain the support wires and maintain the overlap 29 between the two adjacent body portions.

The trough according to the invention described in this specification can be extended to any desired length, if necessary by joining overlapping body portions as described above, over a flat or undulating surface, to provide access for any desired number of animals to feed simultaneously. This allows all animals in a group to access sufficient feed without disadvantaging shy feeders that might be reluctant to compete against more dominant animals in restricted feeding arrangements.

The ends of the trough can be closed but generally end closures are not necessary if only dry (i.e. not liquid) feed material is used in the trough and the feed material is not placed near the ends of the trough.

Figure 2:
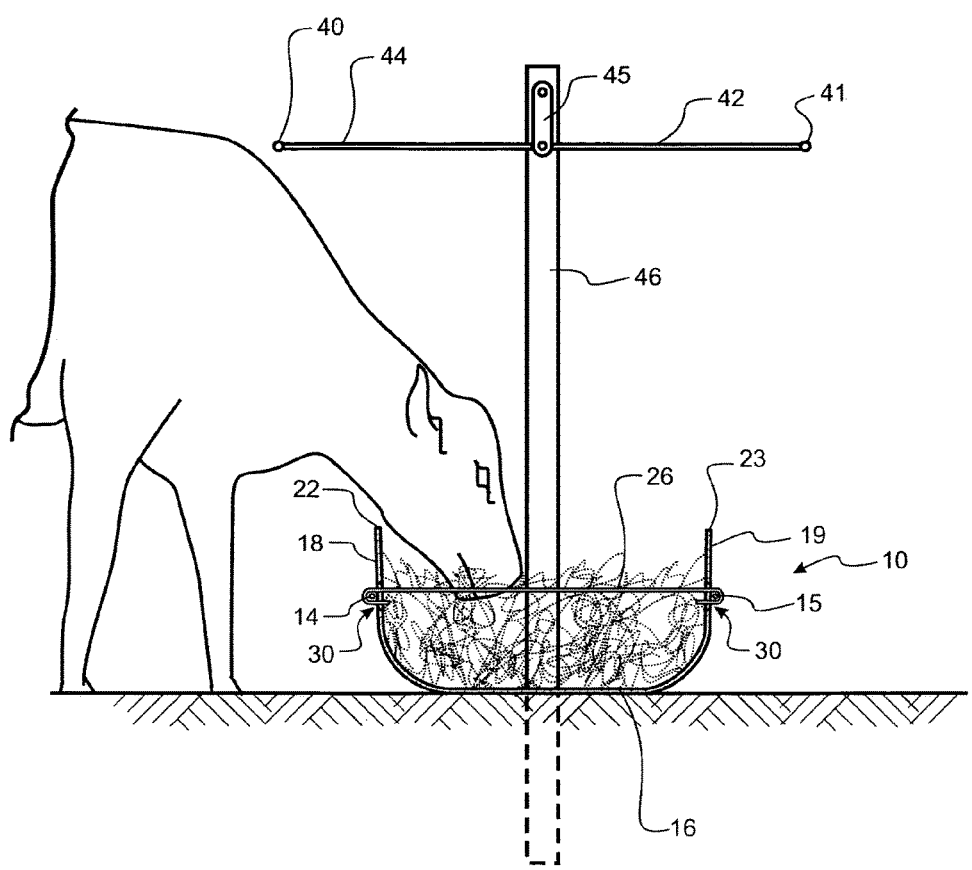
FIG. 2 shows a partly diagrammatic transverse cross-sectional view of a second trough according to the invention.
Figure 3:
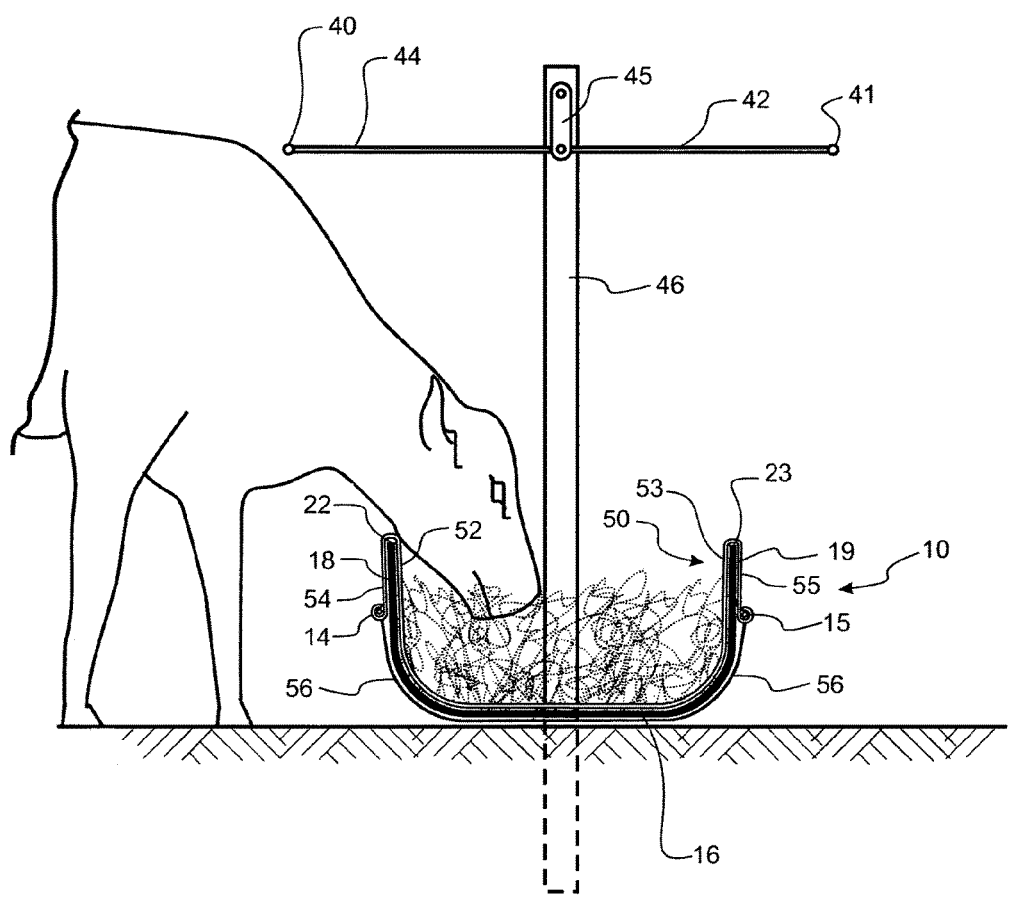
FIG. 3 shows a partly diagrammatic transverse cross-sectional view of a third trough according to the invention.

FIGS. 2 and 3 show partly diagrammatic transverse cross-sectional views of second and third embodiments of the invention. Features corresponding to those discussed above and labelled in FIG. 1 are labelled with like numerals in FIGS. 2 and 3.

FIG. 2 shows a generally U-shaped cross-section of the trough body formed from the sheet material. The transitions between the trough bottom and the two side walls may be curved as shown, or may be folded or creased to give a smaller radius of curvature.

In the embodiment shown in FIG. 2, a trough according to the invention is used in conjunction with generally horizontal electrified wires 40, 41 which extend parallel to and above the trough. The wires are suspended from the outer ends of a plurality of spaced apart outriggers. Each outrigger comprises a pair of arms 42, 44 which are freely suspended from an insulating hanger 45 that is pivotally attached to a respective support post 46. Each support post is driven into the ground through a suitably sized aperture in the bottom 16 of the trough 10. Alternatively, each outrigger is freely suspended from an insulating hanger 45 that is pivotally attached to a generally horizontal wire which is tensioned between a pair of posts, similarly to the arrangement shown in FIG. 5.

The electrified wires are each tensioned between two anchor devices (not shown in the figures), e.g., posts, which are located at respective opposite ends of the electrified wires. The outriggers are distributed along the length of the trough to support the electrified wires at a predetermined height above the trough. The height of the electrified wires is selected to allow animals to feed from the trough but deter the animals from walking or trampling on the trough or the feed material in the trough. The electrified wires, if contacted by an animal, can readily move away from a rest position without being substantially deformed or damaged, and can then return back to the rest position after the animal has recoiled from the electric shock.

This arrangement reduces wastage and spoilage of the feed material which is generally contained within the trough in an unspoiled and uncontaminated condition until consumed by the feeding animals.

In other alternative trough embodiments the support wires, instead of being restrained against outward movement by the restraint wires 26 described above, are restrained and supported by one or more U-shaped brackets. Each bracket has a pair of limbs which extend upward from opposite ends of a middle body portion. The brackets are substantially rigid, or semi-rigid and resilient and may be made from spring steel.

In one trough embodiment (not shown in the figures) a U-shaped bracket is located outside the trough body. The middle body portion of the bracket extends transversely across the trough under the floor or bottom portion of the trough body. The two limbs of the bracket are positioned upright outside the respective trough side walls. The longitudinal support wires are secured to the upper ends of the bracket limbs to restrain the support wires from inward and outward movement and to support the support wires at a desired height.

FIG. 3 shows another trough embodiment, with a U-shaped bracket 50 located largely, but not completely, inside the trough body. Features corresponding to those discussed above and labelled in FIGS. 1 and 2 are labelled with like numerals in FIG. 3. The trough has a generally U-shaped cross-section and is formed from the sheet material.

In the embodiment shown in FIG. 3, the middle body portion of the bracket sits on, and extends transversely across, the floor or bottom of the trough body. Each of the two limbs 52, 53 of the bracket is positioned upright to extend upward inside each respective side wall 18, 19 of the trough. A return portion 54, 55 at the upper end of the limb extends over the top edge 22, 23 of the wall and down the outside of the wall. A support wire 14, 15 is secured to the lower end of the return portion 54, 55, located part way down the outside of the side wall 18, 19, to restrain the support wire from inward and outward movement and to support the support wire at a desired height. The upper portion of the side wall is held between return portion of the limb and the remainder of the limb to restrain the wall from both inward and outward movement. A tie, for example a cord or wire 56, may be passed under the bottom of the trough body to help hold the trough body in the U-shaped cross-section and the trough side walls in place.

Figure 4:
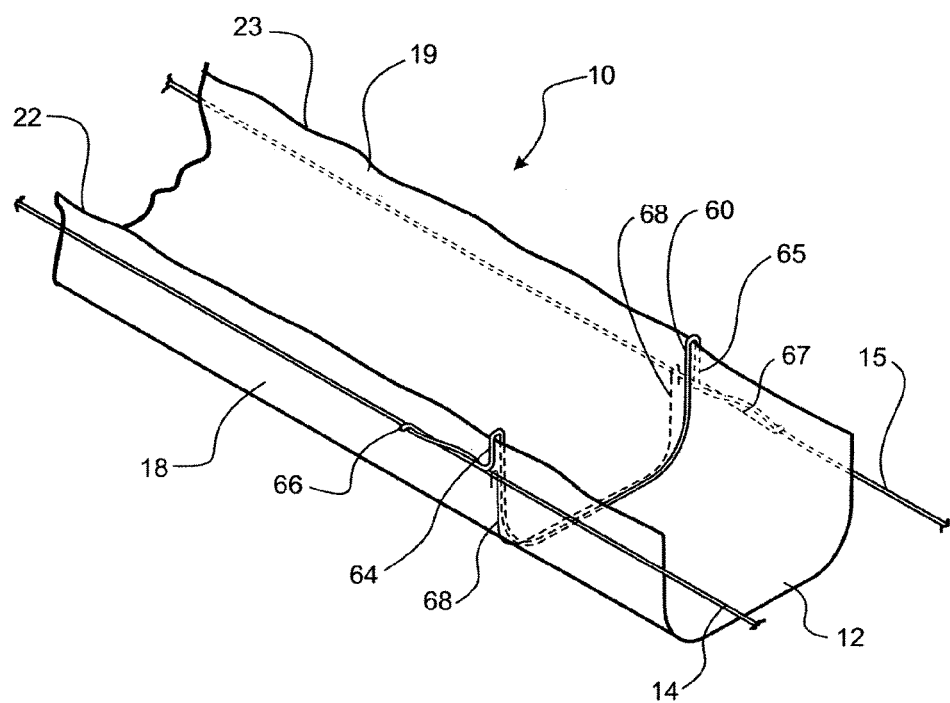
FIG. 4 shows a perspective view of part of a fourth trough according to the current invention.

FIG. 4 shows another trough embodiment, with a U-shaped bracket 60 located largely, but not completely, inside the trough body. Features corresponding to those discussed above and labelled in FIGS. 1, 2 and 3 are labelled with like numerals in FIG. 4. The trough has a generally rounded U-shaped cross-section and is formed from the sheet material.

In the embodiment shown in FIG. 4, the bracket sits 60 on, and extends transversely across the floor or bottom of the trough body and up the inside of each respective trough side wall 18, 19. Respective return portions 64, 65 extend over the top edge 22, 23 and part way down the outside of each wall. A grip portion 66, 67 at each end of the bracket extends substantially horizontally and inter-engages a respective support wire 14, 15. The inter-engagement is by a twist, in the grip portion itself and/or in a corresponding portion of the support wires.

The opposite ends of an elongate tie 68, for example a cord or wire, are connected to a respective grip portion 66, 67 or support wire 14, 15, at or adjacent their twisted engagement. The tie 68 passes under the bottom of the trough body to help hold the trough body in the rounded U-shaped cross-section and the trough side walls in place.

In the embodiments shown in FIGS. 3 and 4, the side walls 18, 19 do not need to be provided with apertures, similar to the apertures 30 seen in Figures 1and 2, through which a transverse restraint is passed to help maintain the support wires 14, 15 at the desired height along the side walls.

Figure 5:
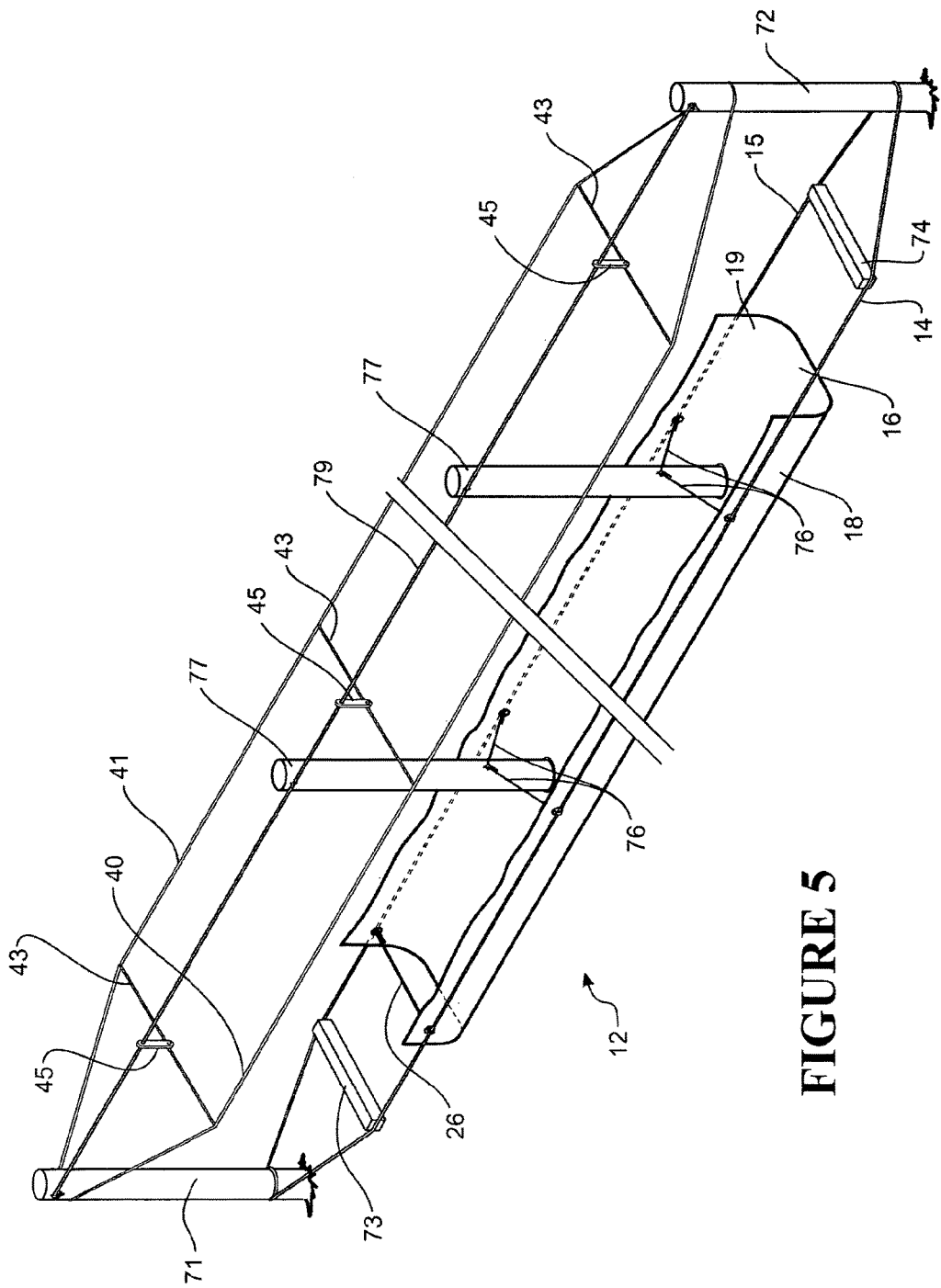
FIG. 5 shows a perspective view of representative end portions of a fifth trough according to the current invention.

In the embodiment shown in FIG. 5, where features already described above and shown in the previous figures are correspondingly labelled, an elongate trough body 12 is supported by two longitudinal support wires 14, 15. Each of the support wires is tensioned between two strainer posts 71, 72 which are located at respective opposite ends of the wires. A substantially horizontal transverse spreader 73, 74 may be located between each strainer post and a respective end of the trough body 12 to hold the two support wires apart by a distance that is approximately the same as a desired width of the trough.

The embodiment shown in FIG. 5 is similar to that shown in FIGS. 1 and 2, in that: the support wires 14, 15 extend along respective outer faces of the opposite side walls 18, 19 below the upper edges of the side walls but higher than the floor or bottom portion 16 of the trough; the trough side walls are maintained upright at least in part by tension in the respective support wires 14, 15; pairs of transversely-aligned perforations are provided in the opposed trough side walls, for example at a mid-height position in the side walls; and the pairs of perforations are distributed at intervals along the length of the trough body.

As seen in the embodiment shown in FIG. 5, a restraint 26 may extend transversely across the width of the trough, between respective engagements at each outer end of the restraint wire with one of the elongate support wires 14, 15, through respective perforations in a trough side wall 18, 19. Alternatively or additionally, as seen in the embodiment shown in FIG. 5, a restraint 76 may extend transversely across part of the width of the trough, from an engagement of the outer end of the restraint 76 with one of the elongate support wires 14, 15, through a respective perforation in a trough side wall 18, 19, to an attachment of the restraint 76 to an upright post 77 which extends upward through a suitably sized aperture in the trough floor 16. The engagement of the outer ends of the restraints 26, 76 with the elongate support wires may be similar to that described above and shown in FIG. 1 or 2.

Each restraint 26, 76 may be fashioned from a length of wire. The restraints 26, 76 may be flexible so that if pressure is applied to the outer face of a side wall 18, 19, for example by an animal feeding at the trough, the side wall can bend inward.

The upright orientation of the side walls may be facilitated by sloping the restraint wire 76 upward from its outer end toward its attachment to the respective post 77. Alternatively (and not shown in FIG. 5), a restraint wire 76 may slope downward from its outer end toward its attachment to the respective post 77 or to the floor 16 of the trough, or may be substantially horizontal.

The side walls 18, 19 may be supported upright, at least in part, by tension in one or more of the transverse restraint wires 26, 76.

In the embodiment shown in FIG. 5, generally horizontal electrified wires 40, 41 extend parallel to and above the trough. The wires are suspended from the outer ends of spaced apart outriggers 43. Each outrigger is freely suspended from a hanger 45 that is pivotably attached to a substantially horizontal top wire 79. The ends of the top wire may be respectively attached to the two strainer posts 71, 72. The top wire is optionally supported by attachment to intermediate posts 77.

The electrified wires 40, 41 are secured to, and tensioned between, the two strainer posts 71, 72. Similarly to the arrangements described above and shown in FIGS. 2 and 3, the outriggers are distributed along the length of the trough to support the electrified wires above the trough at a height that is selected to allow animals to feed from either side of the trough while deterring the animals from walking or trampling on the trough or the feed material in the trough. The electrified wires, if contacted by an animal, can readily swing or move away from a rest position without being substantially deformed or damaged, and can then return back to the rest position after the animal has recoiled from the electric shock. This arrangement reduces wastage and spoilage of the feed material which is generally contained within the trough in an unspoiled and uncontaminated condition until consumed by the feeding animals.

Wire strainers or tensioners (not shown in FIG. 5), for example known ratchet-action wire tensioners, may be fitted in each of the support wires and/or the top wire to apply and maintain sufficient tension to help support the trough side walls and/or to carry the outriggers and electrified wires above the trough. Electrical insulation (not shown in FIG. 5) may be incorporated to electrically isolate the electrified wires 40, 41 from the strainer posts and the intermediate support posts. For example, the outriggers 43 and/or hangers 45 may be insulated, and/or in-line insulators may be placed between the ends of the electrified wires 40, 41 and the strainer posts 71, 72.

In another trough embodiment (not shown in the figures), the sheet material of the trough body provides a trough bottom and only one upright side wall. This first trough side wall is supported by a tensioned support wire as described above. This single-sided trough body is placed against a wall or other suitable barrier which acts as a second trough side wall. Cross tie wires may be fastened at one end to the wall or other suitable barrier, with a loop at the other end of each cross tie wire passing through a perforation in the sheet material at the first trough side wall to connect with the tensioned support wire in the manner described above. One edge of the trough bottom is located adjacent the base of the wall or barrier. That edge can be secured to the ground or floor, or to the base of the wall or barrier, by suitable fasteners.

This single-sided arrangement allows animals to feed from only one side of the trough, unlike the double sided trough arrangements described above and shown in FIGS. 1 and 2, which allow animals to feed from both sides.

The invention claimed is:

1. A trough comprising:
    an elongate trough body,
    at least one elongate support element, and
    at least one transverse restraint, wherein:
    the trough body comprises a bottom portion of the trough body and at least one side wall portion of the trough body;
    the trough body is formed from at least one resilient semi-rigid sheet; the at least one side wall portion extends along a longitudinal side of the trough;
    a lower longitudinal edge of the at least one side wall portion is attached to, or continuous with, a longitudinal edge of the bottom portion;
    the at least one elongate support element extends along the outer face of the at least one side wall portion and is lower than an upper edge of the at least one side wall portion but higher than the bottom portion;
    the at least one transverse restraint extends transversely across the inside of the trough, intermediate the ends of the trough, and is lower than the upper edge of the at least one side wall portion but higher than the bottom portion, the at least one transverse restraint comprising a flexible wire;
    the at least one elongate support element is connected to the at least one transverse restraint and is restrained from moving outward, away from a longitudinal centerline of the trough, at least in part by a tension in the at least one transverse restraint;
    the at least one elongate support element is tensioned between two anchor devices which are located at respective ends of the at least one elongate support element; and
    the at least one side wall portion is maintained upright in part by tension in the at least one elongate support element, in part by the tension in the at least one transverse restraint, and in part by the side wall being biased to push outward against the at least one elongate support element by the resilient semi-rigidity of the sheet;
    wherein the trough body and the at least one transverse restraint are sufficiently flexible so that when a pressure is applied to an outer face of the at least one side wall portion of the trough body at the at least one restraint, the at least one side wall portion deforms and bends inwardly, from an original position, at least at the locality of the applied pressure, and the at least one transverse restraint bends and when the applied pressure is removed, the at least one side wall portion of the trough body resiliently rebounds so that the trough body and the at least one restraint return to their original positions.

2. The trough as claimed in claim 1, wherein the at least one side wall portion has at least one perforation, and an outer end of the at least one transverse restraint extends outwardly through the at least one perforation to connect to the at least one elongate support element.

3. The trough as claimed in claim 1, wherein the at least one restraint is U-shaped and extends along an interior surface of the trough body.

4. The trough as claimed in claim 1, wherein an end of the at least one transverse restraint is formed with a loop through which the at least one elongate support element passes to connect the at least one elongate support element to the at least one transverse restraint.

5. The trough as claimed in claim 1, wherein the at least one elongate support element is supported at a predetermined height at one or more locations intermediate its ends.

6. The trough as claimed in claim 1, wherein the at least one elongate support element is a wire.

7. The trough as claimed in claim 1, wherein:
    the at least one side wall portion comprises two opposed side wall portions which extend along respective opposite longitudinal sides of the trough;
    the at least one elongate support element comprises two elongate support elements which extend along respective outer faces of the two side wall portions;
    each side wall portion of the two opposed side wall portions has perforations which are distributed along the length of the trough;
    the perforations in one side wall portion are respectively aligned transversely across the trough with corresponding perforations in the opposite side wall portion; and
    the at least one transverse restraint is a plurality of transverse restraints located substantially inside the trough with opposite ends of each transverse restraint extending outwardly through respective pairs of transversely aligned perforations to connect respectively to the at least one elongate support elements.

8. The trough as claimed in claim 1, wherein the at least one side wall portion is integral with the bottom portion.

9. The trough as claimed in claim 1, wherein the sheet is continuous along the length of the trough.

10. The trough as claimed in claim 1, wherein the at least one resilient semi-rigid sheet comprises discrete length portions of the at least one resilient semi-rigid sheet that are distributed along the length of the trough.

11. The trough as claimed in claim 10, wherein the discrete length portions are distributed along the length of the trough with adjacent discrete length portions partially overlapping one another.

12. The trough as claimed in claim 1, wherein the at least one sheet is made of a plastics material.

13. The trough as claimed in claim 1, wherein the at least one sheet is provided with a line of weakness about which the at least one sheet preferentially bends when the at least one side wall portion is made non-planar with the bottom portion.

14. The trough as claimed in claim 13, wherein the at least one sheet is creased to provide the line of weakness.

15. The trough as claimed in claim 13, wherein the sheet is provided with perforations along the line of weakness.

16. The trough as claimed in claim 1, wherein the bottom portion is perforated to provide one or more drainage holes.

17. A trough comprising:
    an elongate trough body,
    at least one elongate support element, and
    at least one transverse restraint, wherein:
    the trough body comprises a bottom portion of the trough body and at least one side wall portion of the trough body;

the trough body is formed from at least one resilient semi-rigid sheet; the at least one side wall portion extends along a longitudinal side of the trough;

a lower longitudinal edge of the at least one side wall portion is attached to, or continuous with, a longitudinal edge of the bottom portion, the at least one side wall portion having a perforation extending therethrough;

the at least one elongate support element extends along the outer face of the at least one side wall portion and is lower than an upper edge of the at least one side wall portion but higher than the bottom portion;

the transverse restraint extends transversely across the inside of the trough, intermediate the ends of the trough, and is lower than the upper edge of the at least one side wall portion but higher than the bottom portion, an outer end of the restraint passes through the perforation in the sidewall to connect to the at least one elongate support element;

the at least one elongate support element is connected to the restraint and is restrained from moving outward, away from a longitudinal centerline of the trough, at least in part by a tension in the restraint;

the at least one elongate support element is tensioned between two anchor devices which are located at respective ends of the at least one elongate support element; and the at least one side wall portion is maintained upright in part by tension in the at least one elongate support element, in part by the tension in the restraint, and in part by the side wall being biased to push outward against the at least one elongate support element by the resilient semi-rigidity of the sheet;

wherein the trough body and the at least one transverse restraint are sufficiently flexible so that when a pressure is applied to an outer face of the at least one side wall portion of the trough body at the at least one restraint, the at least one side wall portion deforms and bends inwardly at least at the locality of the applied pressure and the at least one transverse restraint bends and when the applied pressure is removed, the at least one side wall portion of the trough body resiliently rebounds so that the trough body and the at least one restraint return to their original positions.

* * * * *